(12) United States Patent
Zhou et al.

(10) Patent No.: US 9,319,133 B2
(45) Date of Patent: Apr. 19, 2016

(54) ALIGNING TRANSCEIVER SYSTEMS OF A DATA TRANSMISSION NETWORK

(71) Applicant: AOptix Technologies, Inc., Campbell, CA (US)

(72) Inventors: Wei Qiang Zhou, San Jose, CA (US); Hong Yang, Sunnyvale, CA (US); Ahmad Movasseghi, Pleasanton, CA (US); Eric Saint Georges, Los Gatos, CA (US)

(73) Assignee: AOptix Technologies, Inc., Campbell, CA (US)

( * ) Notice: Subject to any disclaimer, the term of this patent is extended or adjusted under 35 U.S.C. 154(b) by 72 days.

(21) Appl. No.: 14/250,679

(22) Filed: Apr. 11, 2014

(65) Prior Publication Data

US 2015/0295644 A1 Oct. 15, 2015

(51) Int. Cl.
*H04B 10/112* (2013.01)
*H04B 10/114* (2013.01)
*H04B 10/11* (2013.01)
*H04B 1/38* (2015.01)

(52) U.S. Cl.
CPC .................. *H04B 10/11* (2013.01); *H04B 1/38* (2013.01); *H04B 10/1123* (2013.01); *H04B 10/1143* (2013.01)

(58) Field of Classification Search
CPC .......................... H04B 10/1123; H04B 10/1143
See application file for complete search history.

(56) References Cited

U.S. PATENT DOCUMENTS

| | | | |
|---|---|---|---|
| 6,967,612 B1 | 11/2005 | Gorman et al. | |
| 7,616,897 B2 * | 11/2009 | Graves | H04B 10/1121 398/119 |
| 8,260,146 B2 * | 9/2012 | Graves | H04B 10/1123 398/118 |
| 8,942,562 B2 | 1/2015 | Pusarla et al. | |
| 2002/0196506 A1 * | 12/2002 | Graves | H04B 10/1125 398/126 |
| 2003/0120364 A1 | 6/2003 | Kirsch | |
| 2004/0042798 A1 * | 3/2004 | Kehr | H04B 10/43 398/135 |
| 2007/0031151 A1 * | 2/2007 | Cunningham | H04B 10/1127 398/131 |
| 2007/0262900 A1 | 11/2007 | Haverkamp et al. | |
| 2008/0131248 A1 | 6/2008 | Friz et al. | |
| 2012/0120258 A1 | 5/2012 | Boutell et al. | |
| 2012/0308235 A1 * | 12/2012 | Pusarla | H04B 10/112 398/79 |
| 2013/0082162 A1 * | 4/2013 | Eide | H04B 10/1123 250/203.3 |
| 2014/0248049 A1 | 9/2014 | Saint Georges | |
| 2015/0281905 A1 * | 10/2015 | Breuer | H04W 4/026 398/118 |

FOREIGN PATENT DOCUMENTS

CN 103715505 A * 4/2014 ............... H01Q 3/02

OTHER PUBLICATIONS

PCT International Search Report and Written Opinion, PCT Application No. PCT/US2015/018975, Jun. 10, 2015, eight pages.

* cited by examiner

*Primary Examiner* — Nathan Curs
(74) *Attorney, Agent, or Firm* — Fenwick & West LLP

(57) ABSTRACT

Methods and systems are described for determining and providing instructions for manual adjustment of a tilt angle of a radio frequency/free space optical transceiver system. Specifically, these instructions are provided for adjusting a tilt angle of a transceiver system using a tilt adjustment so that the transceiver system is approximately at a center of a range of motion of a gimbal assembly. A user interface in communication with a computing system of the local transceiver system provides instructions so that the above-described adjustments are implemented accurately and precisely. This tilt adjustment improves the reliability of the communication network because the gimbal assembly is able adjust the position of the transceiver system during relative movement between the transceivers system, thus maintaining the link despite the relative movement.

17 Claims, 6 Drawing Sheets

ALIGNING TRANSCEIVER SYSTEMS OF A DATA TRANSMISSION NETWORK

BACKGROUND

The present disclosure relates generally to data transmission network transceiver systems, and more specifically to aligning transceiver systems of a data transmission network.

The transmission of data between remote computing systems is common. To facilitate the transmission of data, communications networks have been developed to relay data quickly and reliably between computing systems physically remote from one another using wireless transmission technologies. Many of these wireless technologies transmit and receive omni-directionally. That is, they need not be precisely physically aligned with other transceivers because the signal transmission and reception elements of the transceivers (e.g., their antennas) transmit over a wide range of angles, if not in every direction simultaneously. This generally removes the need for physical alignment of wireless transmitters and receivers. To the extent that alignment between these "omni-directional" systems is needed, it can be performed by measuring signal power from the transceivers and adjusting the position/s of the transmitter and receiver accordingly. This alignment method is colloquially known as received signal strength indication ("RSSI").

Some communication networks, however, perform better when aligned more precisely. This is the case for networks using communication technologies that are not omni-directional. It would be beneficial to have a method for aligning transceivers of a communication network for which RSSI alone is not sufficient.

DETAILED DESCRIPTION

Overview

Embodiments of the present disclosure describe methods and systems for manually aligning, and maintaining alignment, of remotely placed wireless communications transceiver systems. Specifically, the present disclosure describes providing instructions for adjusting the tilt angle of a local transceiver system to perform at least one of a coarse and a fine alignment with a remote transceiver system. These instructions are provided so that the beams of the communication link between a local transceiver system and a remote transceiver system are approximately at a center of a range of motion of a gimbal assembly of the local transceiver system. A user interface in communication with a computing system of the local transceiver system provides instructions so that the above-described adjustments are implemented accurately and precisely.

Adjusting the elevation (or "tilt") as described above improves reliability and makes the communication link more robust during adverse conditions. For example, after such adjustments are made so that a transceiver system operates at approximately the center of range of motion of its associated gimbal assembly (also referred to herein as a "neutral position") during normal conditions, the gimbal is thus able to adjust the position of the transceiver system during periods of relative movement whether twisting, swaying, or both) between the transceiver systems. This maintains the link despite the relative movement. Examples of causes of this relative movement (include wind, earth tremor, and building or tower movement.

In one embodiment, the methods and systems of the present disclosure are implemented in a stand-alone installation computing device that can be placed in communication with a transceiver system. In another embodiment, the methods and systems of the present disclosure are implemented in a computing system integrated with the transceiver.

Transceiver System

Figure 1A:
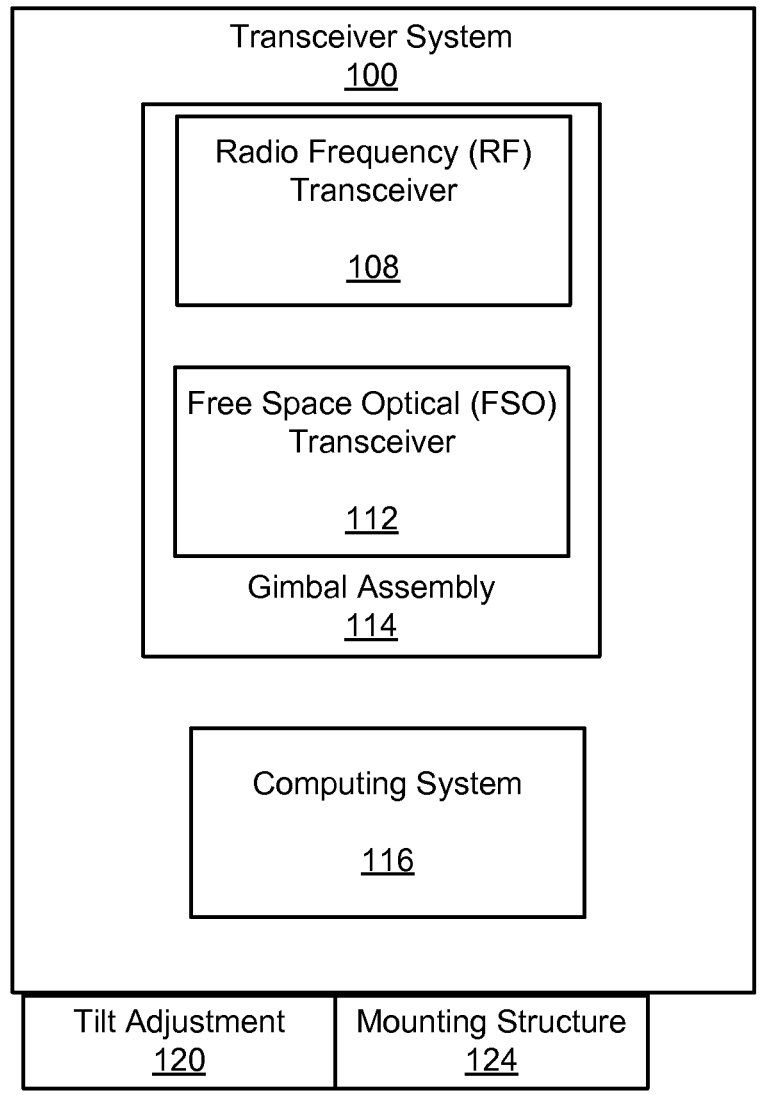
FIG. 1A is a block diagram of a transceiver system used for exchanging information with another similar transceiver system, in an embodiment.

FIG. 1A illustrates an example transceiver system 100 that exchanges (i.e., transmits and receives) information with another transceiver system located remotely from the transceiver system 100. For brevity, these transceiver systems are referred to herein as the "local transceiver system" and the "remote transceiver system," respectively. In this example, the transceiver system 100 includes a radio frequency ("RF") transceiver 108, a free space optical ("FSO"), and enclosure 110, transceiver 112, a gimbal assembly 114 and a computing system 116.

A tilt adjustment 120, connected to the transceiver system 100 and a mounting structure 124, is used to orient the transceiver system, as described in more detail below. In other implementations of the transceiver system 100, other or additional types of transceivers may be used. Further detail regarding an example transceiver system 100 is described in U.S. patent application Ser. No. 13/149,804, titled "Integrated Commercial Communications Network Using Radio Frequency and Free Space Optical Data Communication," which was filed on May 31, 2011, and is incorporated herein by reference in its entirety.

The transceiver system 100 is mounted on a moving platform controlled by a motor. The moving platform, the motor, and the associated mechanical linkages and control systems (not shown) are collectively described as the gimbal assembly 114. The gimbal assembly 114 allows the orientation of a transceiver system to change within a range of motion, often about +/−4° with respect a neutral position of the gimbal assembly, which is defined as the center point of the gimbal assembly range of motion. This ability to adjust orientation assists a transceiver system with maintaining a communication link despite changes in position or orientation caused by relative movement between communicating transceiver systems.

The ability of the gimbal assembly 114 to respond to relative movement between the transceiver systems is limited by the range of motion of the gimbal assembly and the ability of the gimbal assembly to move within this range. The moveable platform of the gimbal assembly 114 generally has a range of motion of +/−4° with respect to a neutral position. For cases in which the remote and local transceivers systems are aligned such that, for example, a local transceiver system is positioned near the fullest extent of a range of motion of its gimbal assembly 114, the system is more likely to lose the communication link in response to relative movement with the remote transceiver system. This is because the gimbal assembly 114, operating near an extreme of its range of motion, is not able move further in one direction as needed to maintain the communication link in response to relative movement. For example, if the transceiver systems are aligned in a routine operating state such that the moveable platform of the gimbal assembly 114 is positioned at +4°, the system cannot respond to perturbations requiring a further re-positioning in the positive direction because the moveable platform is already at the limit of is range of motion.

To address this condition, as further described below, a tilt adjustment 120 for the gimbal assembly 114 allows for manual adjustment of the transceiver system so that the transceiver system is at or near the center of its range (i.e., the neutral position or 0°) in its normal operating condition when aligned with a remote transceiver system. While the term "tilt" is used to describe this adjustment, methods and systems described below are equally applicable to the azimuth orientation ("pan") of a transceiver system which has a range of motion and adjustment range of as much as 360°. This tilt adjustment enables the gimbal assembly to maintain a communication link between transceiver systems in response to perturbations regardless of the adjustment direction needed. In some embodiments, the range of motion of tilt adjustment is at least over the range of motion of the gimbal assembly 114 so that the tilt adjustment is adjustable to return the gimbal assembly to its neutral position regardless of its orientation.

Figure 1B:
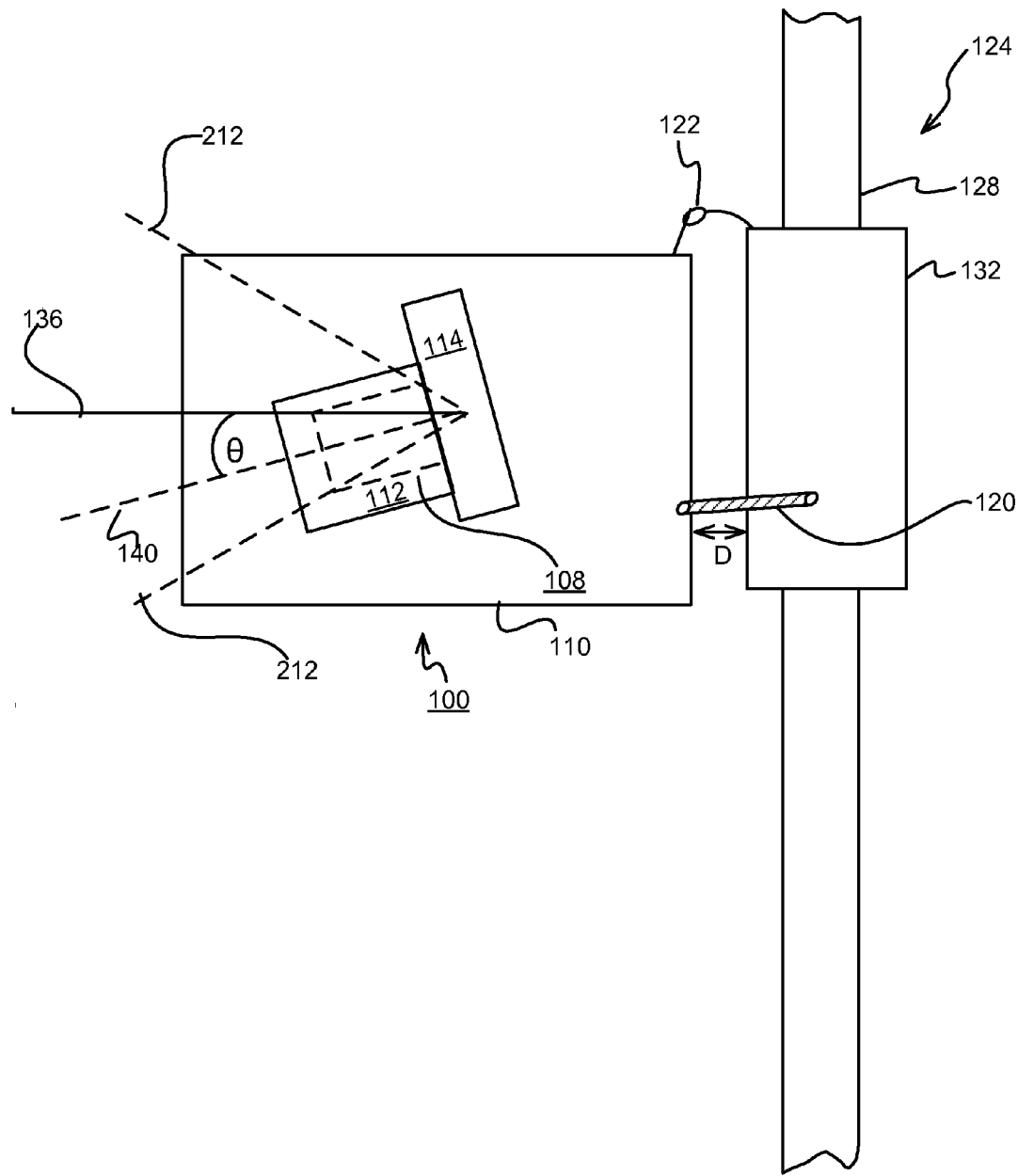
FIG. 1B is a side-view schematic diagram of the transceiver system including a tilt adjustment element, in an embodiment.

As described in more detail in FIG. 1B, the tilt adjustment 120 is mounted to each of the transceiver system 100 (for example, to an enclosure 110) and the mounting structure 124. In the example presented below, the adjustments are described as being manually implemented using screws that change the tilt orientation of the tilt adjustment 120, and thus the tilt orientation of the moveable platform of the gimbal assembly 114. However, other adjustment mechanisms are applicable to the tilt adjustment 120 including, but not limited to encoders, pneumatic adjustment mechanisms, or servo-driven adjustments. Furthermore, as previously mentioned, these adjustments are also applicable to the pan orientation.

Transceiver system 100 also includes a computing system 116 configured to communicate with the RF 108 and the FSO 112 transceivers to control the transmission, reception, and processing of data. The computing system 116 is configured to analyze incoming data streams, process management data regarding the health, status, and/or operation of the transceiver system, and transmit responses to management data inquiries.

The computing system 116 may also be communicatively coupled to computers (not shown) external to the transceiver system 100. These external computers can be both a source of data to be transmitted by the transceiver system 100, as well as a destination for data that has been received by the transceiver system 100.

In this example, the computing system 116 is also used to determine various pointing angles of a local transceiver system with respect to a remote transceiver system, determine the tilt orientation of the moveable platform of the gimbal assembly 114. This information can be transmitted to an external computer that determines tilt adjustments and provide directions so that adjustments are made to the tilt adjustment to place the gimbal assembly 114 at or near the neutral position of its range of motion.

Tilt Adjustment

FIG. 1B illustrates an example transceiver system 100 mounted to a mounting structure 124 with a tilt adjustment 120 and a hinge 122. In this example, the mounting structure 124 includes a vertical pole 128 and a mounting collar 132.

FIG. 1B also shows a reference axis 136 from a neutral position of the gimbal 114 this is an axis of the transceiver system 100 used to illustrate an orientation of the transceiver system. Also shown is a communication axis 140 that illustrates a line between center points of gimbals of adjacent transceiver systems 100. Angle θ identifies the angle between the reference axis 136 and the communication axis 140. The gimbal range of motion 212 is also shown in FIG. 1B but is described in more detail in the context of FIGS. 2A and 2B.

The tilt adjustment 120 is connected at a first end to the mounting collar 132 and at a second end to the transceiver system 100. In this example, the distance D can be increased or decreased by adjusting a screw feed of the tilt adjustment 120, which in turn changes the length of the tilt adjustment 120 screw acting as a strut or prop between the transceiver system 100 and the mounting structure 124. Because the transceiver system is attached to the mounting structure 124 by the hinge 122, changing the distance D using the tilt adjustment 120 effectively pivots the transceiver system 100 about the hinge 122, thus changing the angle θ. As described above, a benefit of this adjustment is reorienting the entire transceiver system 100 so that a gimbal assembly 114 of a local transceiver system is at or near its neutral position while in communication with a remote transceiver system.

The vertical pole 128 provides the physical connection between the transceiver system 100 and the building, tower, or earth surface to which the transceiver system is ultimately connected. The mounting collar 132 surrounds the vertical pole 128 and provides both a convenient element to which the transceiver system can be connected to the vertical pole and a means of adjusting a vertical location of the transceiver system by sliding the mounting collar up and down the vertical pole.

Transceiver System Alignment

Figure 2A:
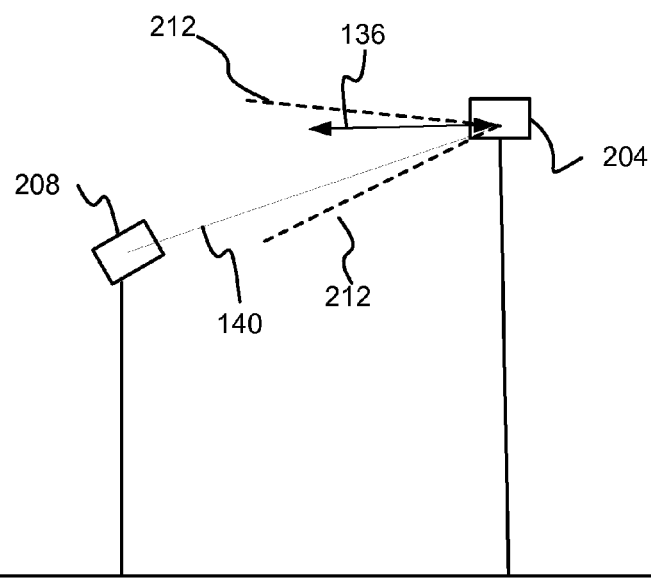
FIG. 2A is a side view illustration of two transceiver systems mounted on neighboring towers in which one transceiver system is oriented at one extreme of a tilt range of a gimbal assembly, in an embodiment.
Figure 2B:
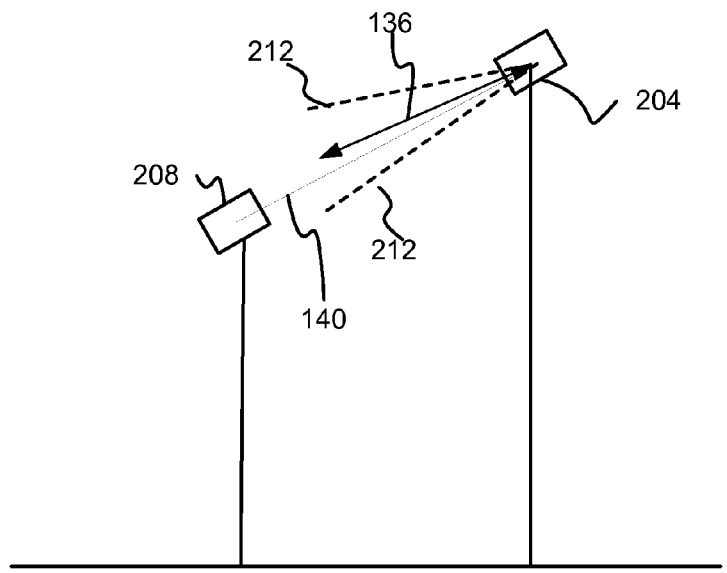
FIG. 2B is a side view illustration of two transceiver systems mounted on neighboring towers in which one transceiver system has been manually adjusted using methods of the present disclosure so that it is oriented approximately in a center of a tilt range of a gimbal assembly, in an embodiment.

FIGS. 2A and 2B illustrate the relationship between a communication link established between a local transceiver system and a remote transceiver system and the tilt orientation of a moveable platform of a gimbal assembly of the local transceiver system.

FIG. 2A illustrates an example in which a local transceiver system 204 is in operative communication with a remote transceiver system 208. FIG. 2A also depicts the tilt range of motion 212 of the local transceiver system with respect to a communication axis 140. The communication axis 140 illustrates an approximate target location of the RF and FSO beams of the transceiver systems within the tilt range of motion 212.

The communication between the local transceiver system 204 and the remote transceiver system 208 is established using, for example, methods described in U.S. patent application Ser. No. 13/786,071, filed on Mar. 5, 2013, and incorporated by reference in its entirety. Unlike omni-directional communication technologies (e.g., used in mobile computing devices or 802.1 protocols), the RF and FSO transceivers of the present disclosure have beam widths on the order of 1° and 0.006° respectively. Therefore, alignment using the methods of U.S. patent application Ser. No. 13/786,071 and further alignment adjustments using embodiments of the present disclosure are used to establish and maintain the communication link.

As shown in FIG. 2A, the local transceiver system 204 is not tilted in the direction of the communication axis 140. As a result, the local transceiver system 204 is at one extreme of the range of motion 212 of its associated gimbal assembly. In other words, should either transceiver system 204 or 208 move, the gimbal assembly of transceiver system 204 cannot move the system in one direction because it is already at one extreme of the tilt range of motion 212.

The problematic configuration shown in FIG. 2A is addressed in FIG. 2B by using embodiments described herein to manually adjust the tilt of the transceiver system 204. As shown in this figure, the tilt has been adjusted so that the orientation of the reference axis 136 is approximately parallel to the communication axis 140.

Example Method

Figure 3A:
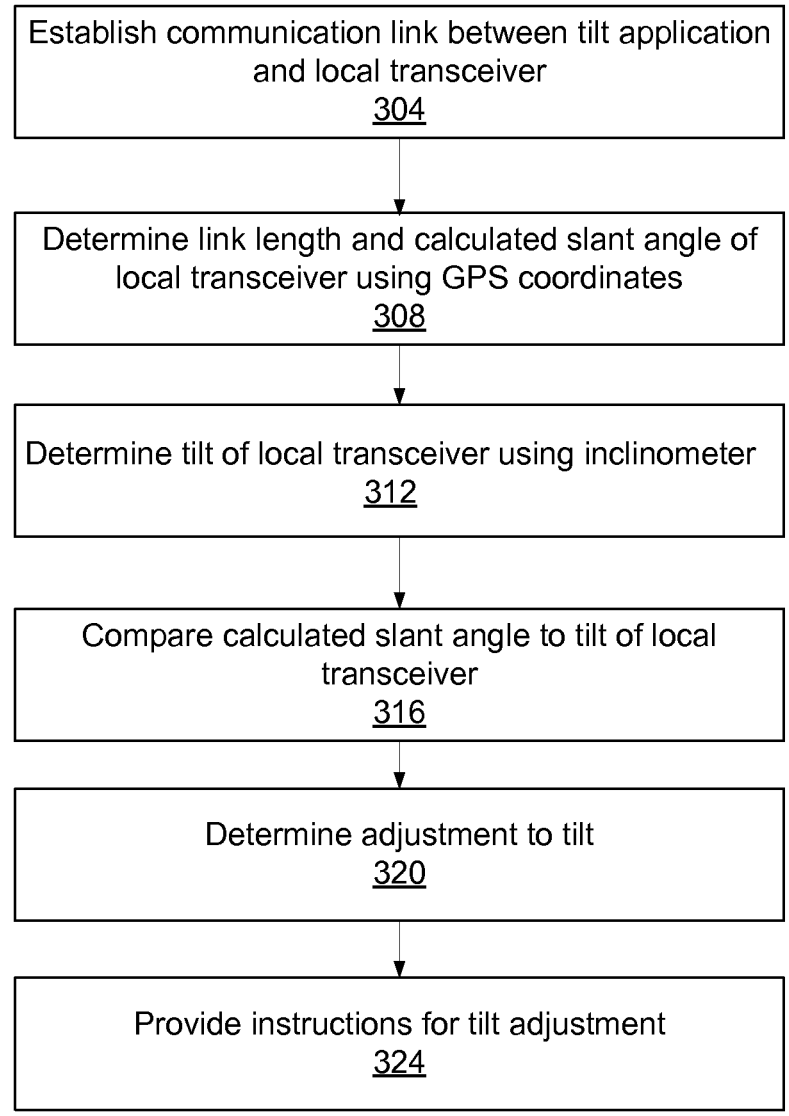
FIG. 3A is a method for coarse manual alignment of a transceiver system, in an embodiment.

FIG. 3A illustrates an example method 300 for coarsely aligning a transceiver system to better maintain communication between remote and local transceiver systems despite perturbations causing relative movement between the transceiver systems. First, a tilt application establishes 304 a communication link with a local transceiver.

A calculated slant angle is identified 308 by the local transceiver system with respect to the remote transceiver system. In one example, this is accomplished by using a Global Positioning System (GPS) module to identify the coordinates of both the local transceiver system and the remote transceiver system. The coordinates include latitude, longitude, and elevation of each of the local and remote transceiver systems. These coordinates are used to determine the distance between the two transceiver systems and a calculated slant angle.

The actual tilt of the local transceiver system is determined 312 with respect to the earth using an inclinometer attached to the moveable platform of the gimbal assembly 114.

The calculated slant angle and the tilt of the local transceiver system are compared 316. The calculated slant angle is compared to the tilt as measured by the inclinometer so that the local transceiver is approximately aligned with the remote transceiver.

Once the position of the gimbal with respect to the calculated slant angle is determined, adjustments to the tilt adjustment are determined 320. This adjustment determination is based on a number of factors. For example, the adjustment mechanisms (e.g., screw thread translators) used to adjust the tilt adjustment are calibrated with respect to the system geometry so that a unit of articulation of the adjustment mechanism (e.g., one complete turn of a screw) is translated into a known tilt adjustment of the transceiver system. Factors used in this calculation include, but are not limited to, screw thread pitch, distance of a screw from a hinge, size of the system and the location of a transceiver within the system, and other geometric factors. Based on the foregoing, instructions are provided 324 in a user interface for adjusting the tilt so that the transceiver system is approximately at a neutral position of its tilt range of motion, as described above.

Figure 3B:
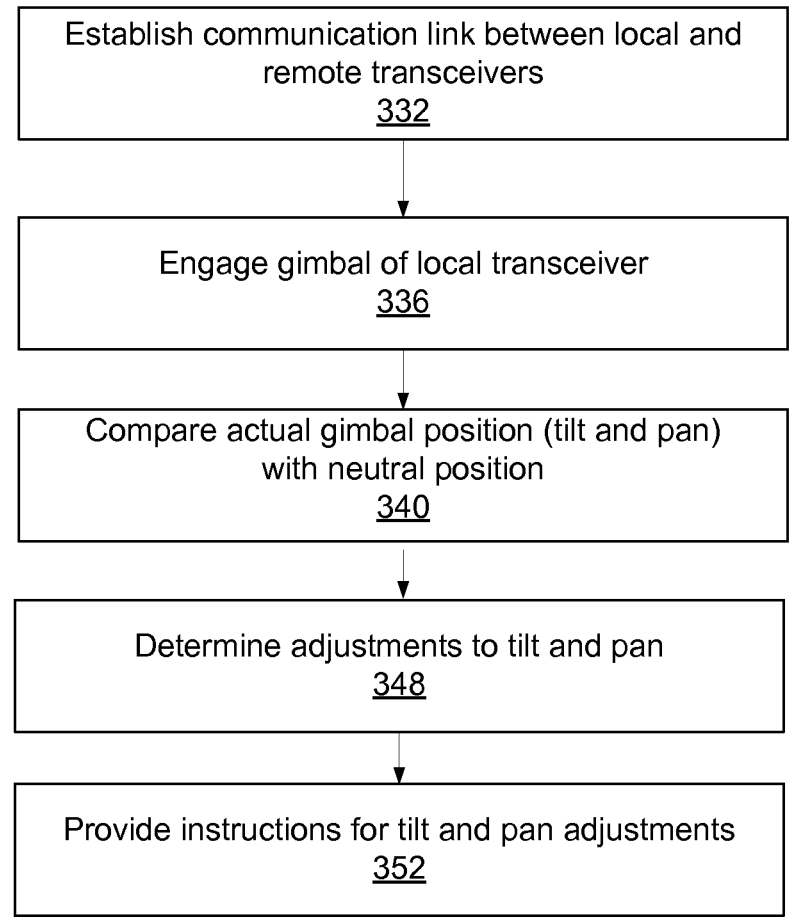
FIG. 3B is a method for manually adjusting an orientation of a transceiver system for fine alignment to place it in an approximate center of a tilt range of a gimbal assembly, in an embodiment.

FIG. 3B illustrates an example method 328 for performing a fine alignment of a transceiver system for both tilt and pan axes to better maintain communication between transceiver systems despite perturbations causing relative movement between transceiver systems. As in the method 300, a link is established between a tilt application and a transceiver but this step is omitted in the method 328 for clarity of explanation. Having previously performed a coarse a tilt alignment as described, above, the neighboring transceivers establish 332 a communication link. The gimbal of the local transceiver will then engage 336 and adjust its orientation based on the quality and nature of the communication link with the remote transceiver.

Having thus engaged and re-oriented itself, the gimbal may not be at or near its neutral position for routine communications. This can be problematic for the reasons described above. Continuing with the fine adjustment, the actual position of the gimbal is compared 340 with its neutral position for both the tilt and pan axes. The local transceiver tilt and pan orientations are then adjusted 348 using the tilt adjustment so that the gimbal is oriented at or near its neutral position.

Example Alignment User Interface

Figure 4A:
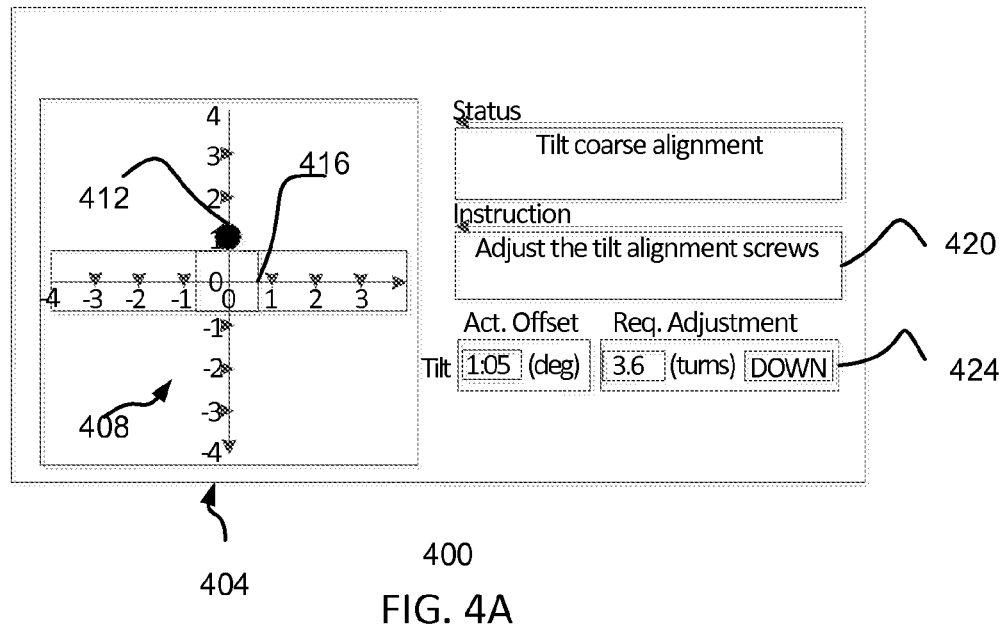
FIGS. 4A and 4B are schematic illustrations of a user interface example providing directions to a user for adjusting an orientation of a transceiver system to place it in an approximate center of a tilt range of the transceiver system's gimbal assembly, in an embodiment The figures depict various embodiments of the present disclosure for purposes of illustration only. One skilled in the art will readily recognize from the following discussion that alternative embodiments of the structures and methods illustrated herein may be employed without departing from the principles described herein.
Figure 4B:
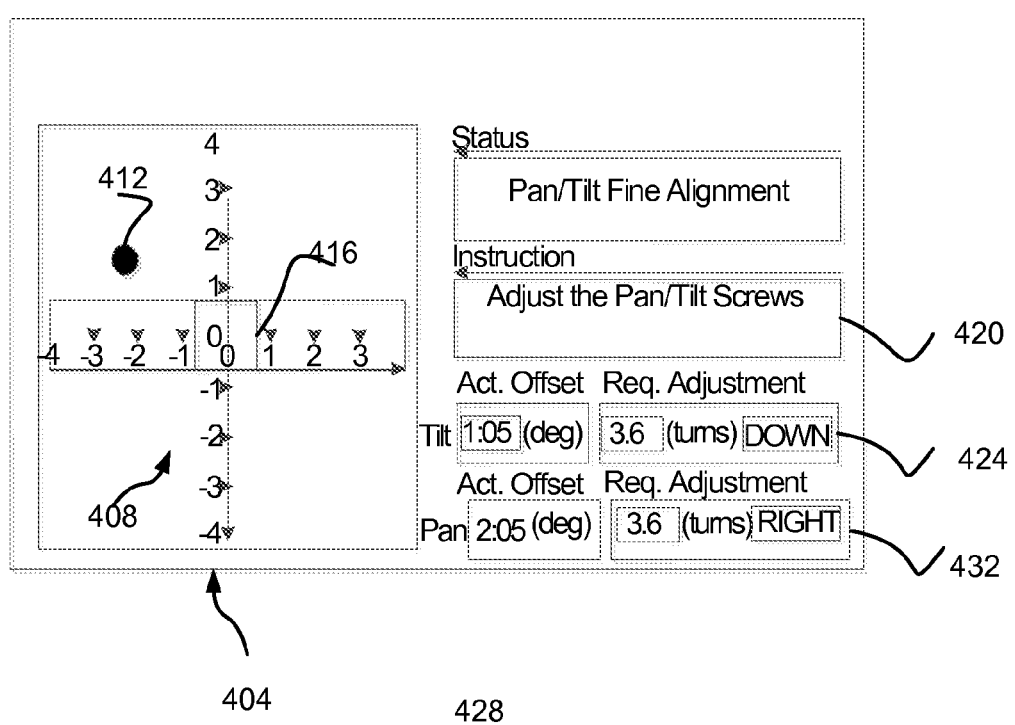

FIGS. 4A and 4B provide examples of user interfaces used to communicate the adjustment instructions to a user during the execution of the coarse alignment method 300 described above. FIG. 4A illustrates a user interface 400 for providing tilt adjustment instructions to a configuration similar to the example shown in FIG. 2A. In this problematic configuration, a local transceiver system is aligned such that the gimbal of the system is positioned away from its neutral position during routine communication with a remote transceiver system. The user interface 400 includes a tilt angle display 404, an instruction display 420, and an adjustment display 424.

The tilt angle display 404 includes a two-axis scale 408, a pan/tilt angle indicator 412, and a target range 416. The two-axis scale 408, used in conjunction with the pan/tilt angle indicator 412, provides a reference by which a user visualizes the current orientation of the transceiver system and the extent to which the pan and the tilt of the transceiver system can be (or should be) adjusted. The two-axis scale 408 shows some or all of a range in which the system is adjustable.

Super-imposed on the two-axis scale 408 is the actual pan and tilt orientation of the transceiver system as shown by the tilt angle indicator 412. As described above, the tilt orientation is determined by an actual tilt of a transceiver as measured by an inclinometer. The tilt angle indicator 412 is also used in conjunction with the target range 416, which together show the actual tilt orientation of the transceiver system with respect to a target tilt orientation.

The user interface 400 provides adjustment instructions for orienting the transceiver system within its target range using an instruction display 420 and adjustment display 424. The instruction display 420 identifies to the user the component of the system requiring adjustment. In the example shown, the instruction display 420 instructs a user to "adjust the tilt alignment screws," which, as described above, are associated with the tilt adjustment element.

However, merely providing an instruction such as the one shown in the instruction display 420 does not provide a user with specific guidance regarding the extent of the adjustment. The adjustment display 424 provides this specific guidance by instructing the user as to the actions to perform to adjust the tilt. In this example, the specific instructions provided are the number of turns ("3") and the direction of turn ("down")

sufficient to bring the transceiver system to at or near its neutral position, and the tilt angle indicator 412 within the target range 416. However, other instructions are provided depending on the adjustment mechanism of the transceiver system.

The user interface of FIG. 4A depicts that used in a tilt coarse alignment. An analogous user interface 428 shown in FIG. 4B shows adjustments used for the fine alignment described in method 328 of both tilt in pan. For example, instructions for adjusting pan are provided in pan adjustment display 432 in addition to those provided in the tilt adjustment display 424. These instructions correspond to the present orientation of a transceiver system as illustrated by indicator 412.

Additional Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A method for adjusting an orientation a first transceiver system, the method comprising:
    establishing a communication link between a first transceiver system and a second transceiver system;
    measuring a gimbal assembly orientation of the first transceiver system comprising at least one of a tilt orientation and a pan orientation;
    comparing the gimbal assembly orientation with a gimbal assembly neutral position and a gimbal assembly range of motion;
    displaying a tilt adjustment instruction, the displayed instruction comprising:
        an identification of an adjustment component; and
        at least one instruction identifying an articulation of the adjustment component for adjusting at least one of a tilt adjustment and a pan adjustment of the first transceiver system, the at least one instruction for manually orienting the transceiver system to within at least one of a tilt target range and a pan target range of the gimbal assembly neutral position.

2. The method of claim 1, further comprising:
    prior to establishing the communication link, calculating a slant angle between the first transceiver and the second transceiver;
    comparing the calculated slant angle to a measured tilt angle of the first transceiver; and
    displaying at least one instruction for aligning the measured tilt angle with the calculated slant angle, the at least one instruction for manually orienting the transceiver system to within at least one of the tilt target range and the pan target range of the gimbal assembly neutral position.

3. The method of claim 1, further comprising displaying a tilt angle indicator on a tilt angle display.

4. The method of claim 1, wherein the at least one instruction is based on at least one dimension of the transceiver system and a screw thread pitch.

5. The method of claim 1, wherein the tilt range of motion is +/−10 degrees.

6. The method of claim 1, wherein the pan range of motion is +/−360 degrees.

7. A non-transitory computer-readable medium that includes instructions that, when loaded into memory, cause a processor to perform a method, the method comprising:
    establishing a communication link between a first transceiver system and a second transceiver system;
    measuring a gimbal assembly orientation of the first transceiver system comprising at least one of a tilt orientation and a pan orientation;
    comparing the gimbal assembly orientation with a gimbal assembly neutral position and a gimbal assembly range of motion;
    displaying a tilt adjustment instruction, the displayed instruction comprising:
        an identification of an adjustment component; and
        at least one instruction identifying an articulation of the adjustment component for adjusting at least one of a tilt adjustment and a pan adjustment of the first transceiver system, the at least one instruction for manually orienting the transceiver system to within at least one of a tilt target range and a pan target range of the gimbal assembly neutral position.

8. The non-transitory computer-readable medium of claim 7, further comprising:
prior to establishing the communication link, calculating a slant angle between the first transceiver and the second transceiver;
comparing the calculated slant angle to a measured tilt angle of the first transceiver; and
displaying at least one instruction for aligning the measured tilt angle with the calculated slant angle, the at least one instruction for manually orienting the transceiver system to within at least one of the tilt target range and the pan target range of the gimbal assembly neutral position.

9. The non-transitory computer-readable medium of claim 7 further comprising displaying a tilt angle indicator on a tilt angle display.

10. The non-transitory computer-readable medium of claim 7, wherein the at least one instruction is based on at least one dimension of the transceiver system and a screw thread pitch.

11. The non-transitory computer-readable medium of claim 7, wherein the tilt range of motion is +/−10 degrees.

12. The non-transitory computer-readable medium of claim 7, wherein the pan range of motion is +/−360 degrees.

13. A system comprising:
a transceiver system comprising:
at least one of an RF transceiver and an FSO transceiver;
a gimbal assembly comprising a gimbal;
a tilt and pan adjustment assembly including a first end and a second end, the first end attached to the transceiver system and the second end attached to a mounting structure;
a computer system comprising:
a communication link placing the transceiver system and the computer system in communication;
a processor that, when executing instructions stored in a non-transitory storage medium, performs a method comprising:
measuring a gimbal orientation of the first transceiver system comprising at least one of a tilt orientation and a pan orientation;
comparing the gimbal orientation with a gimbal neutral position and a gimbal range of motion;
determining at least one instruction identifying an articulation the tilt and pan adjustment assembly for adjusting at least one of a tilt adjustment and a pan adjustment of the transceiver system; and
a display for displaying the at least one instruction.

14. The system of claim 13 further comprising an inclinometer attached to the gimbal assembly for measuring at least one of a tilt orientation and a pan orientation of the first transceiver system.

15. The system of claim 13, wherein the method performed by the processor further comprises:
calculating a slant angle between the first transceiver and a second transceiver;
comparing the calculated slant angle to a tilt angle of the first transceiver measured by an inclinometer attached to the first transceiver system; and
displaying at least one additional instruction for aligning the measured tilt angle with the calculated slant angle, the at least one instruction for manually orienting the transceiver system to within at least one of the tilt target range and the pan target range of the gimbal assembly neutral position.

16. The system of claim 13 wherein determining the at least one instruction is based on at least one dimension of the transceiver system and a screw thread pitch of the tilt and pan adjustment assembly.

17. The system of claim 13, wherein the computer system further comprises a global positioning system sensor.

* * * * *